US008666704B2

(12) United States Patent
Vitek

(10) Patent No.: US 8,666,704 B2
(45) Date of Patent: Mar. 4, 2014

(54) VISUALIZATION OF RADIO FREQUENCY COVERAGE

(75) Inventor: Clark A. Vitek, Portland, OR (US)

(73) Assignee: Aruba Networks, Inc., Sunnyvale, CA (US)

( * ) Notice: Subject to any disclaimer, the term of this patent is extended or adjusted under 35 U.S.C. 154(b) by 1070 days.

(21) Appl. No.: 11/830,719

(22) Filed: Jul. 30, 2007

(65) Prior Publication Data

US 2009/0037149 A1    Feb. 5, 2009

(51) Int. Cl.
    *G06F 17/10* (2006.01)

(52) U.S. Cl.
    USPC .................................................. 703/2; 703/13

(58) Field of Classification Search
    CPC .................................................. G06F 17/5018
    USPC ........................................ 703/2, 13; 370/338
    See application file for complete search history.

(56) References Cited

PUBLICATIONS

Kostic, A.; Rancic, D.;, "Radar coverage analysis in virtual GIS environment," Telecommunications in Modern Satellite, Cable and Broadcasting Service, 2003. TELSIKS 2003. 6th International Conference on, vol. 2, No., pp. 721-724 vol. 2, Oct. 1-3, 2003.*

Hata, M., "Empirical formula for propagation loss in land mobile radio services," Vehicular Technology, IEEE Transactions on, vol. 29, No. 3, pp. 317-325, Aug. 1980.*

L.B. Cebik, Refining Our Notions of Azimuth Patterns, available at http://www.antennex.com/w4rnl/col1206/amod106.html, published in antenneX 12, 2006, Online Issue #116, 9 pages.*

Ponnuswamy, Subbu, "RF Basics: Part 1," The Edge, Apr. 14, 2007, pp. 1-5, Aruba Networks, http://edge.arubanetworks.com/article/rf-basics-part-1.

Zyren, Jim and Petrick, Al, "Tutorial on Basic Link Budget Analysis," Intersil Corporation, Jun. 1998, pp. 2-1 through 2-8, www.intersil.com.

* cited by examiner

*Primary Examiner* — Kamini S Shah
*Assistant Examiner* — Luke Osborne
(74) *Attorney, Agent, or Firm* — Varun A. Shah

(57) ABSTRACT

Radio Frequency (RF) coverage models are visualized by displaying three dimensional unity scaled models of antenna performance in a Geographic Information System (GIS), Traditional logarithmic scaled antenna models are converted to linear models and stored as three dimensional representations which are placed and scaled using a GIS to visualize RF coverage.

20 Claims, 8 Drawing Sheets

VISUALIZATION OF RADIO FREQUENCY COVERAGE

BACKGROUND OF THE INVENTION

The present invention relates to radio frequency (RF) coverage planning, and more specifically, to methods for visualizing RF coverage.

RF coverage planning assists the RF engineer in answering the question, where do I need to put antennas to provide a specified service level over a given area, or to answer the corollary question, what will my coverage be if I put antennas in the following locations?

One skilled in the art of RF engineering can perform calculations and make coverage predictions. These predictions typically require information along the following lines to be available: radio characteristics such as transmit power and receive sensitivity, antenna radiation characteristics, transmission lines, and the medium through which the coverage must be planned.

In a method typical of the prior art in displaying coverage based on antenna characteristics, the engineer first obtains antenna pattern information. This may be obtained from measurements, by modeling the antenna, or may be provided by antenna suppliers. Such antenna information is typically presented as a series of 2 dimensional plots in logarithmic units such as dBi (decibels above isotropic) or dBd (decibels above dipole). FIG. 1 shows typical antenna plots as known to the art. Two pattern plots called "Azimuth" on the left and "Elevation" (or horizontal and vertical) on the right are shown for various frequencies, representing two planes of the complete 3 dimensional antenna pattern. As is common to the antenna arts, these plots are dimensioned in logarithmic units, not linear units. In the plots of FIG. 1, the outer circle is the 0 dB reference line. The circles labeled 10 are 10 dB below the 0 dB reference, a factor of 10 decrease in power. The circles labeled 20 are 20 dB below the 0 dB reference, a factor of 100 decrease in power.

Based on the two dimensional Azimuth plot shown in FIG. 1, the engineer can obtain the maximum antenna gain, the direction of maximum gain, and the gain relative to the maximum in any horizontal direction. Similarly, the two dimensional Vertical plot carries this same information for the vertical direction.

Using such gain plots, the engineer defines a coverage area. This coverage area is typically described based on the angles at which the antenna pattern is 3 dB below the maximum, representing a factor of 2, or a 50% reduction in power. These angles are referred to as the "−3 dB beamwidth" and the area contained in this beamwidth is referred to as the "Coverage Area."

A two dimensional graphic representation of the coverage area is prepared based on antenna and radio characteristics. This may be formed using polygons or circles, or a line showing maximum range of coverage. This two dimensional graphic representation is presented along with other two dimensional graphics such as floor plans or maps to show the coverage area for planning purposes or network monitoring. Such a display as known to the art is shown as FIG. 2.

This method of visualization has a number of problems. The antenna coverage as described does not accurately represent the full three dimensional coverage of the antenna system. When used for planning purposes, this can lead to unexpected coverage loss when the vertical or elevation pattern of the antenna is important. When used for monitoring, the lack of full three dimensional antenna pattern visualization can lead to difficulties in solving coverage problems. These occur, for example, when the antennas being deployed are in different vertical planes than the devices they will be servicing, such as when antennas are placed high on poles or towers, or antenna coverage is to be calculated for an area with a range of vertical positions, such as the interior of an arena with seats at many different levels.

When prepared according to the process described, coverage visualization is not directly scalable when viewed on maps or charts. This is because antenna pattern information is traditionally and typically presented in logarithmic units (e.g. dBi) as shown in FIG. 1, while maps and charts are in linear units (meters or feet). Thus, if radio, antenna, or other aspects of the coverage model change, the graphical representation (coverage model) must be completely recalculated and redrawn.

BRIEF DESCRIPTION OF THE DRAWINGS

The invention may be best understood by referring to the following description and accompanying drawings that are used to illustrate embodiments of the invention.

DETAILED DESCRIPTION

Embodiments of the invention relate to preparing and displaying RF coverage models by mapping or using a Geographic Information System (GIS). According to one embodiment of the invention, a base unity coverage model is produced using the three dimensional pattern of an antenna. This three dimensional base unity coverage model is linear in nature and is independent of antenna gain, radio parameters such as transmit power and receive sensitivity, and environmental factors such as signal absorption by trees. Since the base unity coverage model is linear, it can be scaled using linear scaling factors. These scaling factors may be based on antenna absolute gain, feedline parameters, radio parameters, regulatory requirements, and/or environmental factors, for example. The three dimensional coverage model can be directly viewed, and rapidly re-scaled along with other linear features such as distance in mapping and Geographic Information Systems (GIS).

According to the present invention, antenna gain and pattern information is obtained. Such information may be obtained by modeling (simulating) the antenna using computer software programs known to the art such as NEC, MININEC, and EZNEC. The "Numerical Electromagnetic Code" (NEC) simulator was originally developed by the Lawrence Livermore National Laboratory for use on mainframe computers. Versions of NEC have been placed in the public domain and adapted for use on modern personal computers. Commercial antenna modeling products are also available, such as the Antenna Modeling Design System (AMDS) from the EEs of division of Agilent Technologies.

Antenna gain and pattern information may also be obtained by making measurements of antenna response. Antenna gain and pattern information on commercially available antennas is usually available from the antenna manufacturer.

In preparing a unity three dimensional model of the antenna pattern, the antenna gain and pattern information must be rescaled from logarithmic to linear form. This may be done mechanically using a computer if the data is already available in digital form. The data may be read off graphs such as those shown in FIG. 1 and converted using a computer spreadsheet or calculator.

Figure 3:
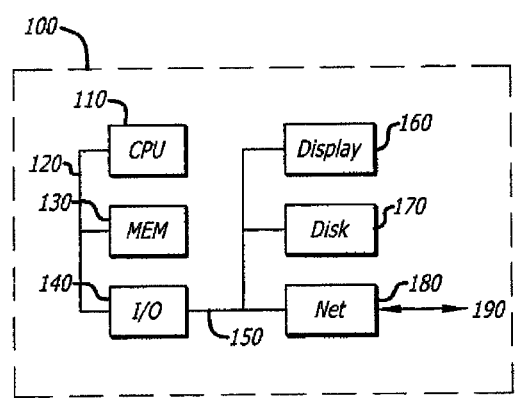
FIG. 3 shows a block diagram of a digital computer.
Figure 4:
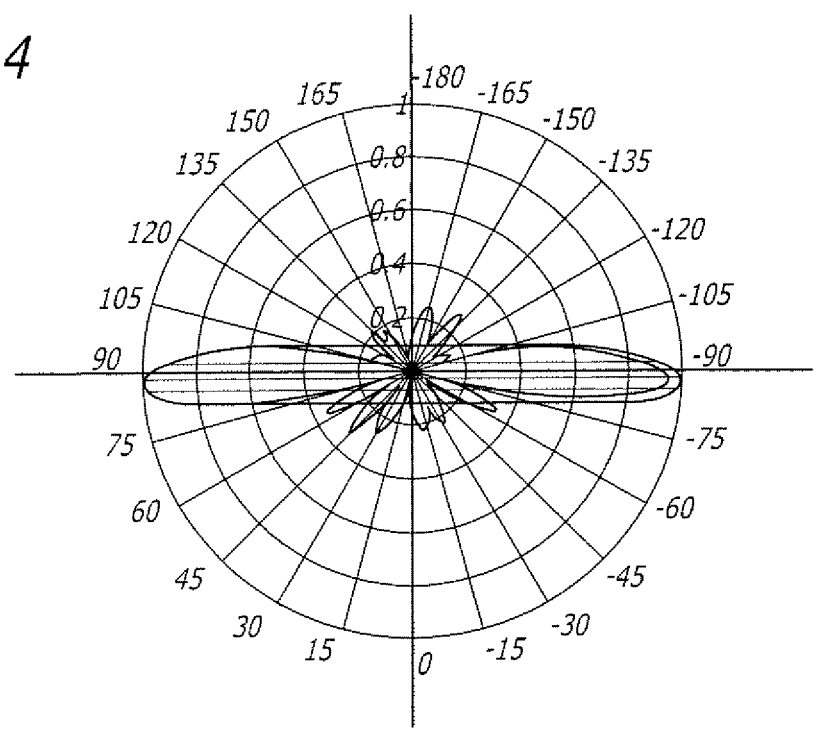
FIG. 4 shows a linearly scaled antenna pattern.
Figure 4:
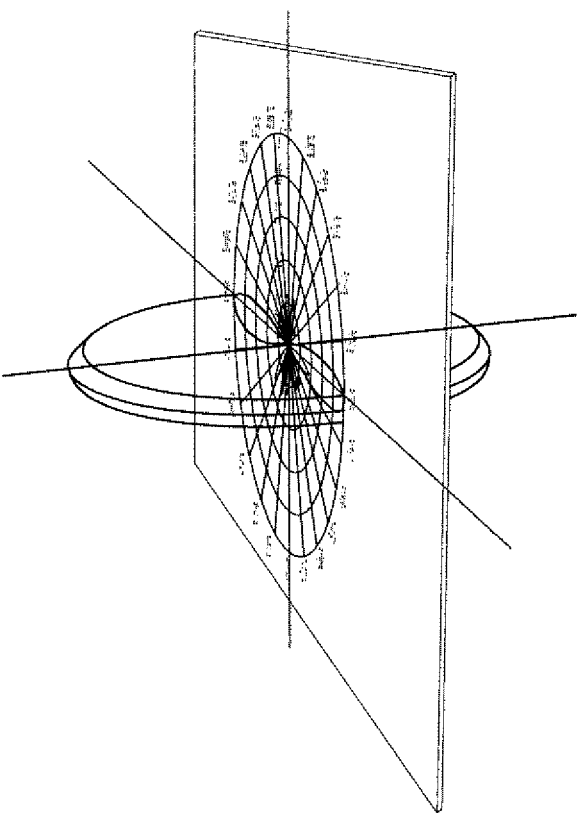

A digital computer 100 suitable for implementing an embodiment of the invention is shown in a simplified conceptual block form as FIG. 3. Such computers are well known to the art; a general purpose computer may be used, such as those marketed by Apple Inc, Dell, Lenovo, or a myriad of others. Special purpose computers may also be used. Generally in computer 100, CPU 110 communicates over bus 120 with memory hierarchy 130 and I/O hierarchy 140. CPU 110 may be any suitable processor for the intended task. Common CPUs include the ia86 family from companies such as Intel, AMD, and Via, and RISC CPUs from companies such as IBM, Freescale, MIPS, ARM, and their equivalents. Memory hierarchy 120 typically includes nonvolatile memory used in startup as well as volatile read-write memory such as dynamic random access memory (DRAM). Memory hierarchy 120 contains instructions and data which are executed or interpreted by CPU 110 in the performance of the processes and tasks described herein. One or more I/O controllers 140 communicate 150 with I/O devices such as display 160, disk storage 170, and network controller 180. In many computers, it is common for display 160 to have its own specialized I/O controller. Disk storage 170 traditionally includes read/write devices such as flash and CF cards and hard disk drives. Other media in the form of read and read/write CD or DVD devices may also be supported. Network controller 180 communicates with other computers (not shown) via network 190, typically using well known standards such as wired Ethernet and wireless 802.11 technologies. Computer 100 operates under the control of an operating system such as OS X™, Windows, one of the variants of Linux® and Unix®, or one of the more specialized operating systems for dedicated applications such as VxWorks® from WindRiver Systems.

Figure 1:
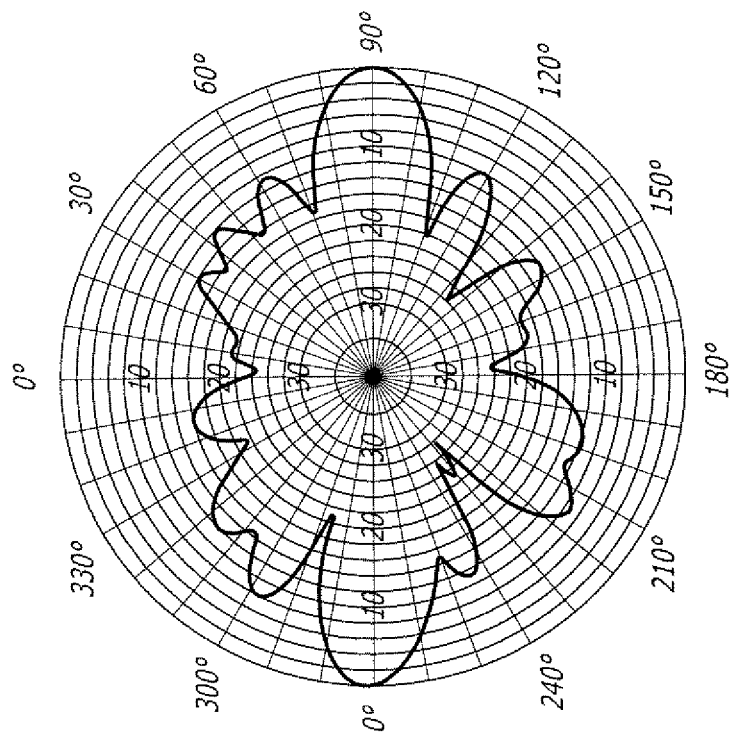
FIG. 1 shows antenna plots as known to the art.
Figure 1:
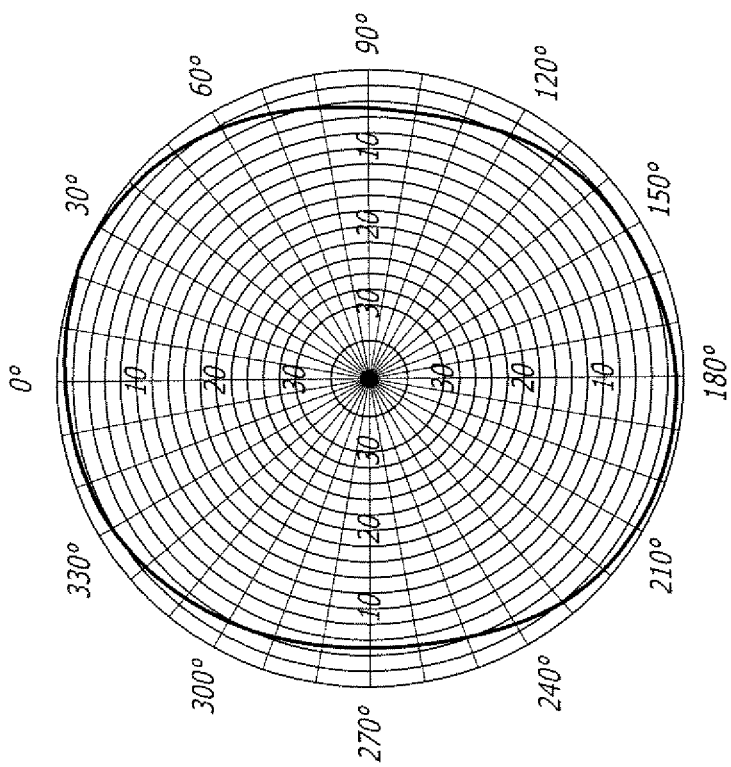

Once the antenna data is available in linear form, a unity three dimensional model of the antenna pattern is constructed. Such a unity three dimensional model (hereinafter a unity model) may be constructed using a standard three dimensional modeling program such as Autocad® from Autodesk, Inc., or Pro/Engineer® from Tristar Inc. Other programs capable of 3d modeling, or dedicated programs may also be used. In constructing the model, antenna performance is scaled linearly for distance, unlike the traditional logarithmic scaling as shown in the graphs of FIG. 1. Performance values are relative to the maximum gain. As an example, the maximum scale is 1.0 at the point of maximum gain, and all other points in the three dimensional space are relative (and less than or equal to) to and linearly scaled to the maximum. Any appropriate maximum scale value may be used.

A unity model is an antenna model which represents the full three dimensional response pattern of an antenna but is void of absolute scale, instead having relative scale. A unity model may be rescaled using linear scaling factors to account for RF and environmental parameters, and then displayed directly on linearly scaled representations of geographical features such as maps, aerial photos, survey drawings, or composites thereof, to accurately show radio frequency signal levels.

The unity model is then stored in a three dimensional graphic format such as Collada™, Autocad®, or Pro/Engineer®. In one embodiment, the Collada™ format is used. Collada™ defines an open standard XML schema for exchanging information among graphics software applications, and is maintained by the Khronos Group, an open-source consortium. The Collada™ format is supported by Autodesk®, among other programs. A library of unity models for different antennas may be provided, for example in a database, or as a set of files.

The unity model stored in a graphic format may then be rapidly rescaled according to the above calculations for radio effects and displayed using a graphics display program, preferably a Geographic Information Systems (GIS) application such as Google Earth® from Google, Inc., ArcGIS® from ESRI, or other GIS or mapping application. These radio effects include but are not limited to feedline losses, transmitter power limits imposed by both hardware and regulatory requirements, and signal levels required to support specific data rates. Such effects may also include design margins accounting for variations introduced by antenna mounting, environmental factors, and the like.

As an example, the maximum equivalent isotropically radiated power (EIRP) level of a system is limited by regulation in many countries. EIRP is the combination of transmitter power, antenna gain, and feedline losses. Establishing the maximum predicted distance for a specific data rate is a calculation known to the art traditionally known as link budget analysis, and includes parameters including but not limited to transmitter EIRP, frequency, client EIRP, required receiver noise floor, and effective signal to noise ratios (SNR). Once calculated, the maximum predicted distance may be used to scale the unity model for display in the GIS.

RF link budget analysis is explained for example in application note AN9804.1, Tutorial on Link Budget Analysis, first published in June of 1988 by Intersil Corporation. An additional tutorial is provided in RF Basics —Part 1 by Aruba networks.

In one embodiment, Collada-format unity models are displayed using Google Earth Pro™. This allows the 3D antenna models in graphic form to be overlaid on maps and coverage examined in detail. In the display process, the unity models may be scaled by a single scale factor at the time of display by multiplying or dividing the unity model uniformly across all three axes in the three dimensional space (X, Y, and Z). In some circumstances, it may be necessary to scale the unity model for X, Y, and Z axes independently.

As an example in an embodiment using Google Earth Pro™, a property is located in Google Earth®. Using the map/overlay capabilities of Google Earth Pro™, placemarks are defined in three dimensions for each antenna. Unity models of antennas are associated with each placemark and scaled appropriately. Scaling may represent a number of factors. As examples, unity models may be scaled to represent volumes over which the transmit or receive signal levels exceed a threshold, or the signal to noise level is above a specified threshold. Unity models may be scaled to represent data rates based on transmit —receive signal levels, or signal to noise ratios. Unity models may be scaled to represent throughput of radio links, again as based upon transmit —receive signal levels, or signal to noise ratios. Coverage may be viewed in Google Earth®, and the model viewed from different directions and orientations using the features of the GIS program.

Figure 2:
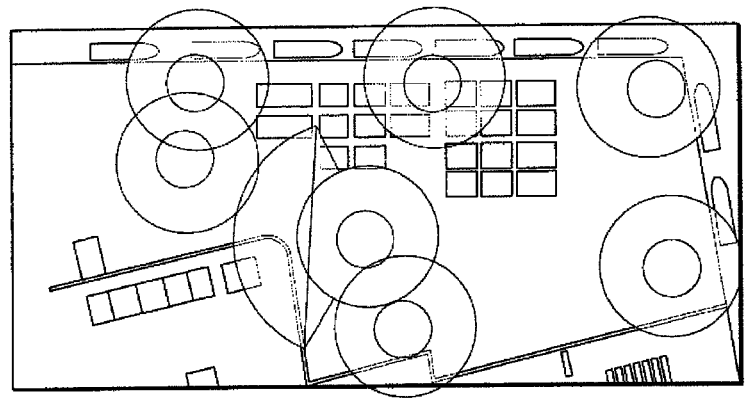
FIG. 2 shows a coverage display as known to the art.
Figure 5:
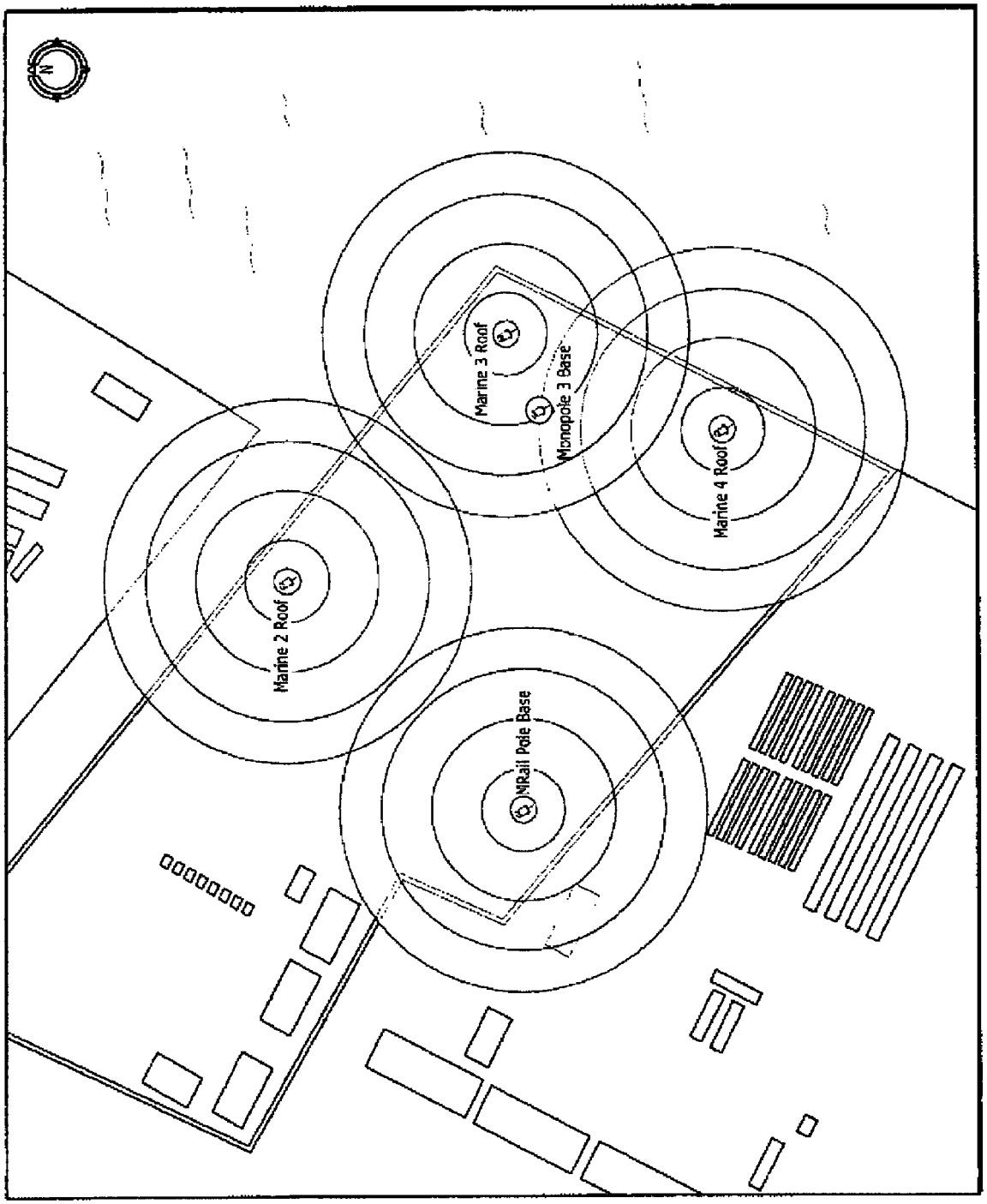
FIG. 5 shows a first view of a unity model displayed by a GIS.
Figure 6:
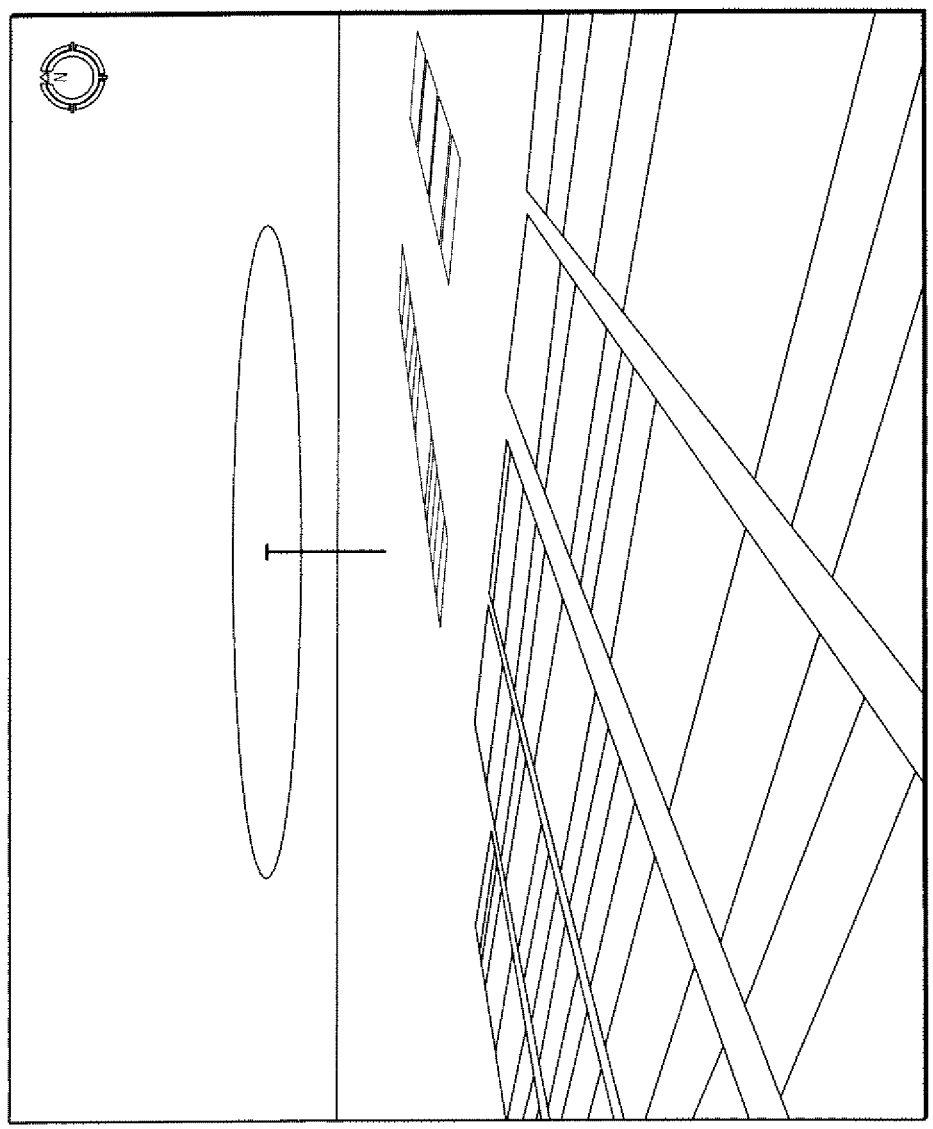
FIG. 6 shows a second view of a unity model displayed by a GIS.

FIG. 5 shows an example of a unity model displayed in a GIS according to the present invention. Superficially, this display resembles that of FIG. 2. But using the abilities of the GIS, in this example, Google Earth Pro™ to easily manipulate the image, changing viewpoints and scale, altering zoom, tilt, and pan for example, FIG. 6. shows that when the antenna in question is mounted at the top of a 30 meter tall mast, signal coverage does not reach the ground.

Figure 7:
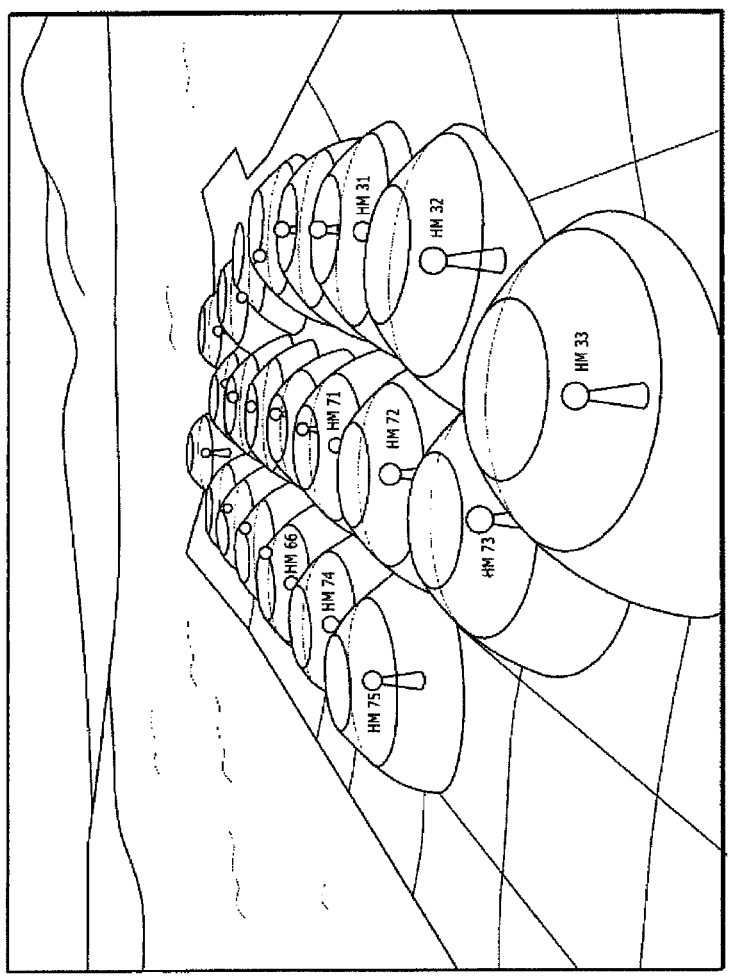
FIG. 7 shows a third view of a unity model displayed by a GIS.

FIG. 7. shows a further example of a unity model displayed in a GIS according to the present invention. In this example, a set of downtilt antennas are shown providing coverage extending to ground level, and using the ability of the GIS to allow the user to fly through the proposed installation, observing coverage from different directions, heights, and perspectives.

Figure 8:
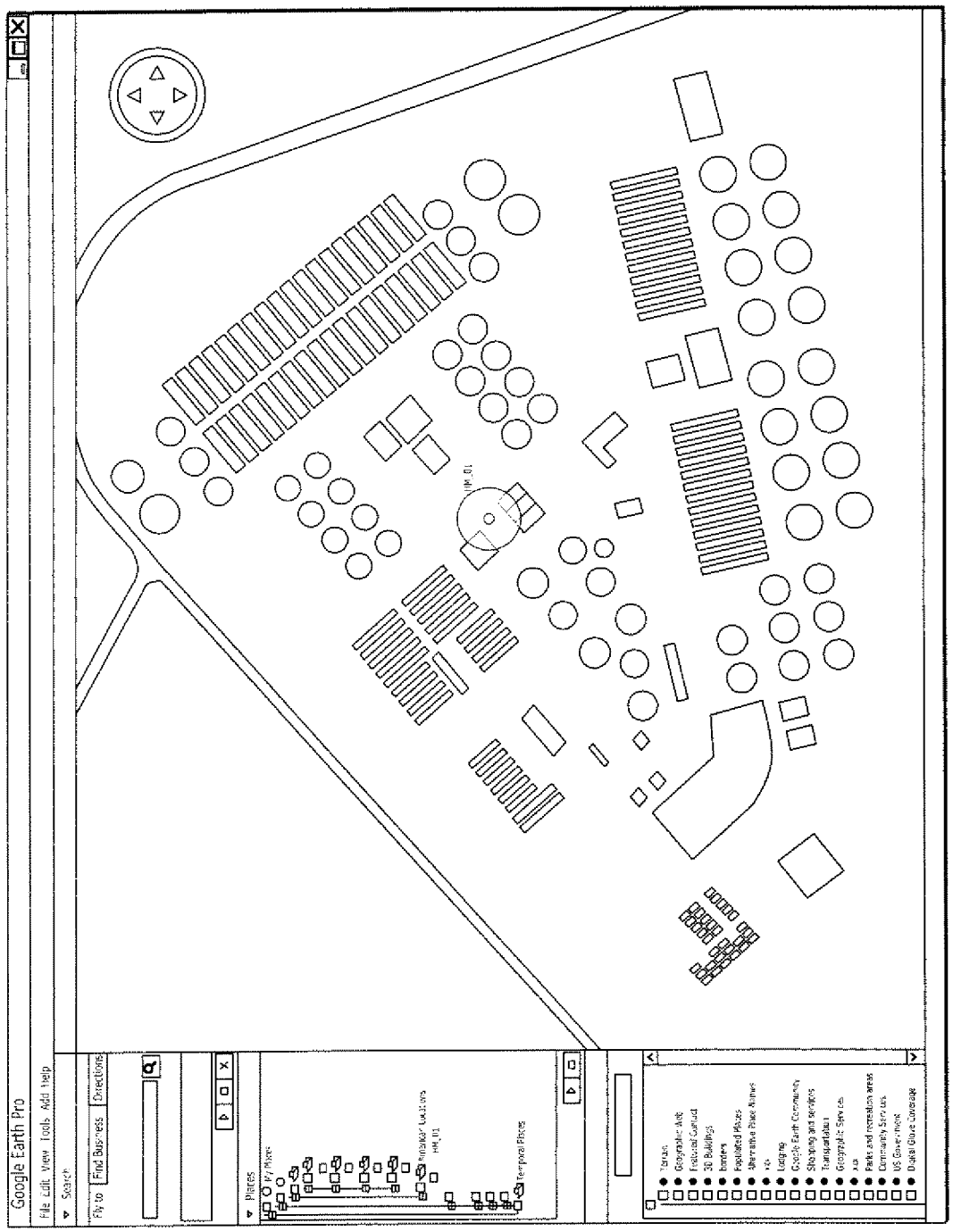
FIG. 8 shows a first unity model in a family displayed by a GIS.
Figure 9:
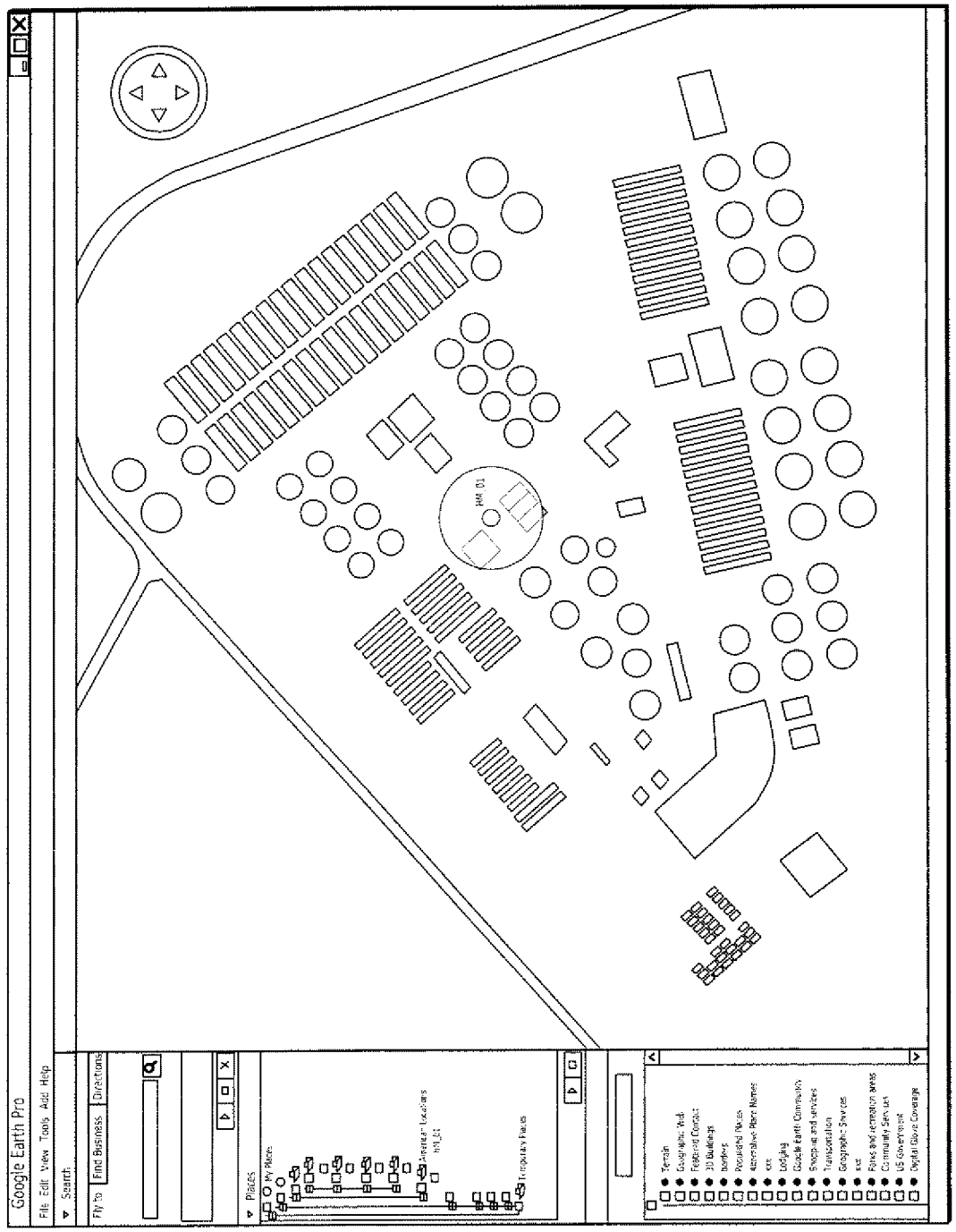
FIG. 9 shows a second unity model in a family displayed by a GIS.

A library of different unity models representing different antenna types may be provided. In one embodiment, families of unity models may be provided for each antenna type, each unity model in the family representing a different characteristic. In one embodiment, different unity models in a family may represent contours for predetermined signal levels. In an 802.11 wireless environment, these different predetermined signal levels may be color coded to represent minimum signal levels required to support specific datarates. FIGS. 8 and 9 show unity models from the same antenna family, illustrating coverage for different data rates based upon predetermined signal levels or signal to noise ratio.

The library of unity antenna models and the software implementations of the processes herein described may be stored on a machine-readable medium. A "machine readable" medium may include any medium which can store or transfer information, such as read-only media including but not limited to CD and DVD media, diskettes including floppy disks, ZIP disks, and other removable media, hard disk drives, memory cards, optical disks, or similar media. Components of the software implementations and the data they require may be stored locally, such as on disk storage element 170 of FIG. 1, while it is anticipated that other components will be stored remotely and accessed via network 190.

While the invention has been described in terms of several embodiments, the invention should not be limited to only those embodiments described, but can be practiced with modification and alteration within the spirit and scope of the appended claims. The description is this to be regarded as illustrative rather than limiting.

What is claimed is:

1. A non-transitory machine readable medium comprising a set of instructions which, when executed by at least one processor, cause performance of a set of operations comprising:
generating a first antenna model which represents a first three dimensional visualization of a response pattern of an antenna;
scaling the first antenna model in three dimensions based at least on an antenna absolute gain to obtain a second antenna model which represents a second three dimensional visualization of the response pattern of the antenna,
wherein the antenna absolute gain comprises a linear scaling factor value used for scaling the first antenna model, the first antenna model being a linear antenna model;
wherein the first antenna model represents relative antenna gain values and the second antenna model represents absolute antenna gain values; and
displaying the second three dimensional visualization with respect to geographical information or storing the second antenna model with respect to geographical information.

2. The non-transitory machine readable medium of claim 1 wherein generating the first antenna model comprises generating a linear antenna model by converting a logarithmic antenna model.

3. The non-transitory machine readable medium of claim 1 wherein the first antenna model is generated using RF parameters including antenna data, the antenna data comprises at least one of (i) antenna pattern models, (ii) antenna test data, and (iii) antenna pattern plots.

4. The non-transitory machine readable medium of claim 1, wherein scaling the first antenna model to obtain the second antenna model comprises:
applying the antenna absolute gain to values corresponding to all axes of the first three dimensional visualization.

5. The non-transitory machine readable medium of claim 1, wherein scaling the first antenna model to obtain the second antenna model comprises:
scaling the first antenna model to represent maximum predicted distance for the response pattern of the antenna based on account feedline losses and transmitter power limits imposed by both (a) hardware and (b) regulatory requirements.

6. The non-transitory machine readable medium of claim 1, wherein the second antenna model represents signal to noise ratio.

7. The non-transitory machine readable medium of claim 1, wherein the second antenna model represents transmit or receive signal levels.

8. The non-transitory machine readable medium of claim 1, wherein the second antenna model represents associated data rates of radio links based on transmit or receive signal levels or signal to noise ratio.

9. The non-transitory machine readable medium of claim 1, wherein the second antenna model represents throughput of radio links based on transmit or receive signal levels or signal to noise ratio.

10. The non-transitory machine readable medium of claim 1, wherein prior to scaling the first antenna model, associating the first antenna model with a placemark in a geographical information system.

11. A method comprising:
generating a first antenna model which represents a first three dimensional visualization of a response pattern of an antenna;
scaling the first antenna model in three dimensions based at least on an antenna absolute gain to obtain a second antenna model which represents a second three dimensional visualization of the response pattern of the antenna,
wherein the antenna absolute gain comprises a linear scaling factor value used for scaling the first antenna model, the first antenna model being a linear antenna model;
wherein the first antenna model represents relative antenna gain values and the second antenna model represents absolute antenna gain values; and
displaying the second three dimensional visualization with respect to geographical information or storing the second antenna model with respect to geographical information;
wherein the method is performed by at least one device comprising a hardware processor.

12. A system comprising:
at least one device including a hardware processor;
the system being configured to perform the operations of:
generating a first antenna model which represents a first three dimensional visualization of a response pattern of an antenna;
scaling the first antenna model in three dimensions based at least on an antenna absolute gain to obtain a second antenna model which represents a second three dimensional visualization of the response pattern of the antenna,
wherein the antenna absolute gain comprises a linear scaling factor value used for scaling the first antenna model, the first antenna model being a linear antenna model;
wherein the first antenna model represents relative antenna gain values and the second antenna model represents absolute antenna gain values; and
displaying the second three dimensional visualization with respect to geographical information or storing the second antenna model with respect to geographical information.

13. The system of claim 12, wherein scaling the first antenna model to obtain the second antenna model comprises:
scaling the first antenna model to represent maximum predicted distance for the response pattern of the antenna based on account feedline losses and transmitter power limits imposed by both (a) hardware and (b) regulatory requirements.

14. The system of claim 12, wherein the second antenna model represents signal to noise ratio.

15. The system of claim 12, wherein the second antenna model represents transmit or receive signal levels.

16. The system of claim 12, wherein the second antenna model represents associated data rates of radio links based on transmit or receive signal levels or signal to noise ratio.

17. The system of claim 12, wherein the second antenna model represents throughput of radio links based on transmit or receive signal levels or signal to noise ratio.

18. The system of claim 12 wherein generating the first antenna model comprises generating a linear antenna model by converting a logarithmic antenna model.

19. The system of claim 12 wherein the first antenna model is generated using RF parameters including antenna data, the antenna data comprises at least one of (i) antenna pattern models, (ii) antenna test data, and (iii) antenna pattern plots.

20. w) The system of claim 12, wherein scaling the first antenna model to obtain the second antenna model comprises:
applying the antenna absolute gain to values corresponding to all axes of the first three dimensional visualization.

* * * * *